Patented June 20, 1944

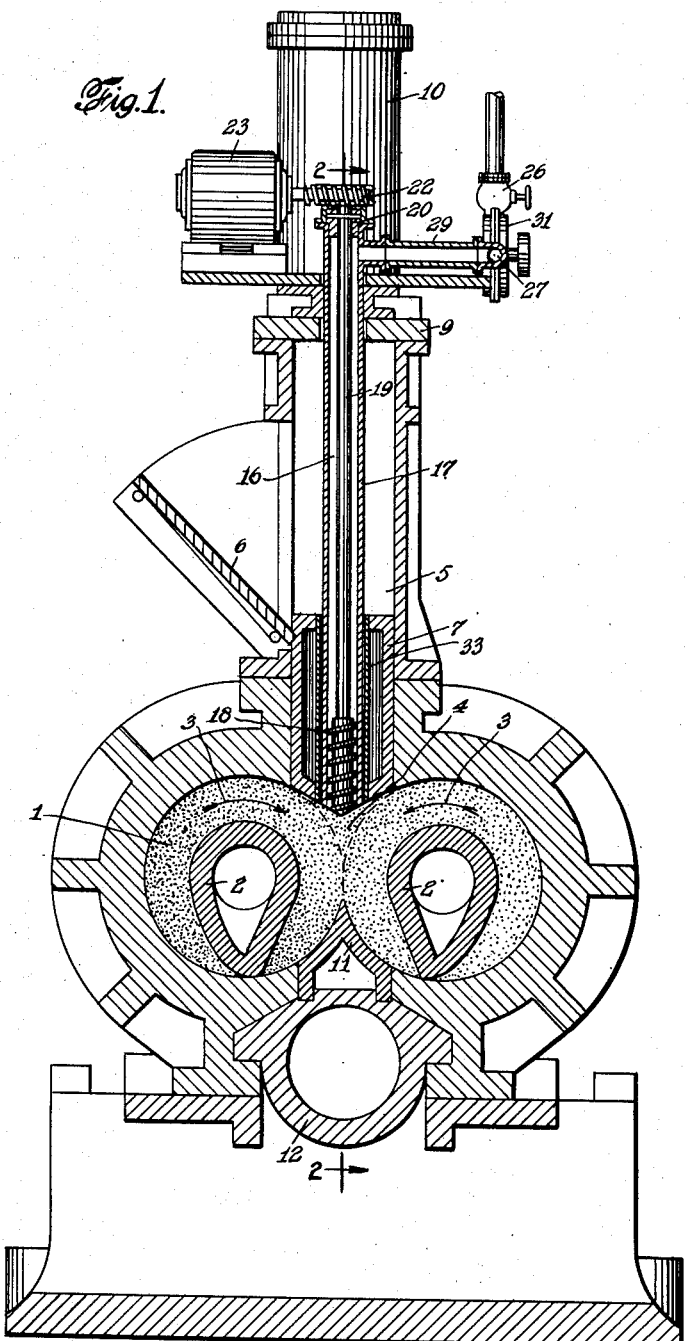

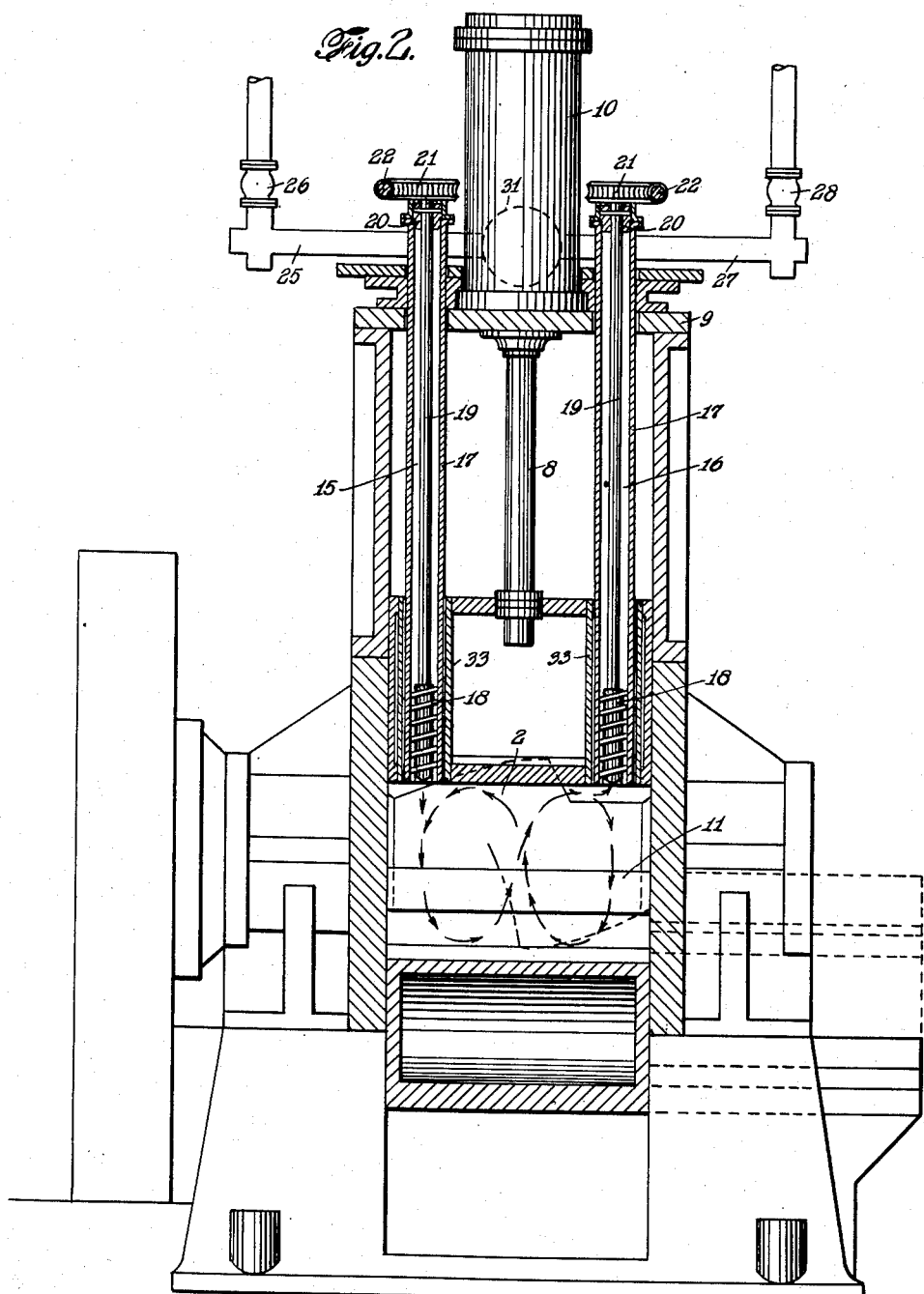

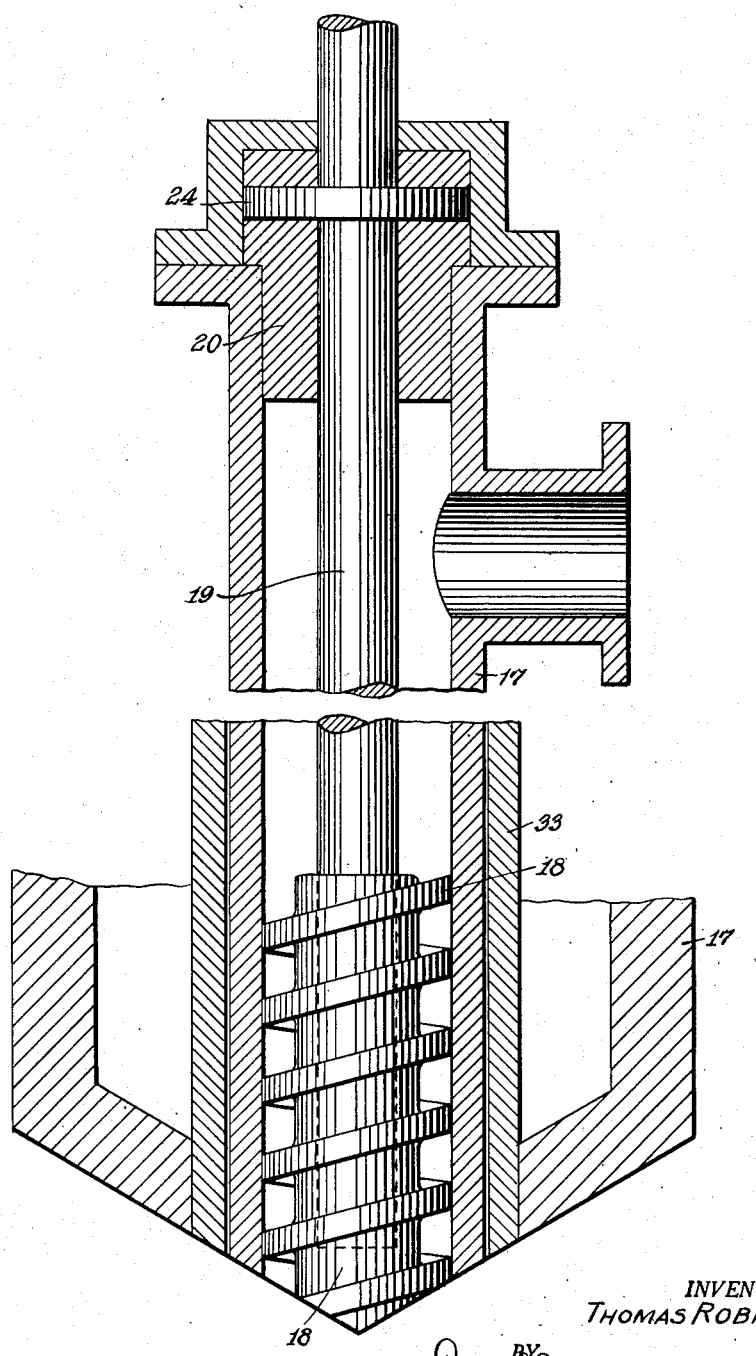

2,351,706

UNITED STATES PATENT OFFICE 2,351,706

APPARATUS FOR TREATING PLASTIC MATERIAL IN A CONTROLLED ATMOSPHERE

Thomas Robinson, New York, N. Y.

Application November 16, 1943, Serial No. 510,456

10 Claims. (Cl. 18—2)

My invention consists in the novel features hereinafter described, reference being had to the accompanying drawings which illustrate one embodiment of the same, selected by me for purposes of illustration, and the said invention is fully disclosed in the following description and claims.

The present invention relates to apparatus for processing rubber and like materials in a controlled atmosphere while being worked in an internal mixer, and likewise for removing fluids or gases from the materials being mixed. In the following specification and claims the term "gases" is used in a generic sense to include vapors.

An object of the invention is the effective plasticization or treatment of rubber and other plastic materials by the introduction of suitable gases while the material is being worked and masticated, the direct heating of the material by the introduction of hot gases, the direct cooling of the material by cold gases, the bleeding off of steam, air or other gases while the material is being processed, and the contacting of the plastic mass with selected gases at predetermined pressures and temperatures to impart definite characteristics to the material.

It is known that when rubber is masticated in an internal mixer the occluded air in the rubber and in the mixing chamber facilitates plasticization and is effective in reducing the power consumption and mechanical working necessary to reduce the rubber to the desired plastic state. There is, however, no control over the quantity of the air that is used and previous efforts to introduce gases into or withdraw gases from a mixing chamber containing a moving mass of soft plastic material under pressure have not been successful. To date it has not been commercially possible to contact the rubber or other plastic material uniformly with the treating gases or to prevent the inlet line into the chamber from being clogged by the plastic material. It has been an even greater problem to evacuate gases from a chamber containing a moving plastic mass owing to the fact that the plastic is forced into the outlet pipe and blocks the gas exit.

It is an object of this invention to provide internal mixers in which the plastic material being treated is acted on uniformly by a predetermined quantity of a selected gas or vapor to plasticize the same with the minimum power and in the shortest time, and to impart desired characteristics to the material.

Another object of the invention is to control the temperature of the material being processed in the mixing chamber by the direct application to the material of heated or cooled gases.

A further object of the invention is to bleed off the steam which is formed during the process of mastication by reason of moisture in the charging stock.

A feature of the preferred form of my invention is that the contacting gases are introduced into the mixing chamber at a point where they are most effectively dispersed through the material being processed. Preferably the contacting gases are introduced into the chamber at one point and removed at another to insure the maximum reaction time of the gases with the material being treated, provision preferably being made for recirculation of the gases during the process and for the maintenance of suitable pressure.

A further feature of the invention is that the novel means for introducing the gases into the mixing chamber and for evacuating gases from the chamber are so constructed that the soft plastic material being worked in the chamber will not clog the inlet or outlet passageways, so that a free passage for the gases is maintained at all times.

Other features, characteristics and advantages of the invention will be apparent from the following description and claims and from the accompanying drawings wherein there is shown by way of example an arrangement of apparatus for carrying out my invention. In the drawings, Fig. 1 is a vertical cross section of an internal mixer embodying my invention.

Fig. 2 is a vertical longitudinal section taken approximately on the line 2—2 of Fig. 1.

Fig. 3 is an enlarged fragmentary cross section taken on the same plane as Fig. 1.

In accordance with my invention the mixing chamber of an internal mixer is provided with fluid passageways which are self-cleaning to allow free passage of gases and are located in such relation to the material being treated that uniform contacting of the material with the gases is speedily effected. Moreover the self-cleaning passageways permit the withdrawal of gases from the mixing chamber as well as the recirculation of the gases with which the material is being contacted. Preferably the means for preventing clogging of the fluid passageways is so constructed as to effect local agitation of plastic material adjacent the inner ends of the passageways to effect more rapid dispersion of the gases.

The mixer consists essentially of an enclosed mixing chamber 1, which is double cylindrical in cross section and is equipped with parallel rotors, 2, rotatably mounted coaxially with the particylindrical portion of the mixing chamber. The rotors 2 are roughly pear-shaped in cross section so as to provide acute converging surfaces with the cylindrical walls of the mixing chamber. Longitudinally the rotors are formed in an interrupted spiral so that the material being treated is subjected alternately to low pressure, intensive mixing zones, and to high pressure zones, and is circulated longitudinally of the mixing chamber while it is being interworked by rotation of the rotors, thus bringing every part of the mass into contact with every other part and producing a homogeneous mix. The rotors are rotated in opposite directions, as indicated by arrows 3, so that plastic material in the bite of the rotors, indicated by reference number 4, is drawn downwardly by the converging downward motion of the rotor lobes. In this region of the bite between the rotors the plastic being treated is under lower pressure than at any other point in the chamber, and is subjected to the intense mixing action. The rotors are preferably hollow as shown, and both the rotor and the mixing chamber may be equipped for temperature regulation.

The plastic material to be treated is charged into the mixing chamber through a feeding neck 5, provided at one side with a hinged door 6, which may be swung out to the position shown to provide a hopper into which the charge is dumped. A ram or closure member 7 is vertically reciprocable in the feeding neck 5 by means of a piston rod 8 which extends up through a head piece 9 at the upper end of the feeding neck, and is connected with a piston in a vertical cylinder 10. Means is provided for applying pressure fluid to the cylinder 10 to effect the raising and lowering of the ram 7. With the ram 7 in uppermost position the material to be treated is dumped into the hopper 6 and plied into the feeding neck 5. The ram 7 is then lowered, forcing the material into the mixing chamber 1. At the bottom of the mixing chamber there is provided a longitudinally slidable gate 11 operable by a fluid operated cylinder 12 to provide for discharged material from the mixing chamber after its treatment in the chamber has been completed.

During the mixing or processing operation the ram 7 presses the plastic material into the bite between the rotors and intense mixing action occurs in this region. In accordance with my invention provision is made for introducing controlled amounts of selected gases into this region of low pressure and intense mixing action under controlled conditions of temperature and pressure. Provision is also made for exhausting gases from the mixing chamber and of controlling pressure in the mixing chamber by regulating the pressure at which the gases are exhausted, it being understood that this pressure may be either above or below atmospheric pressure. It is a further feature of my invention that the introduction of gases into the mixing chamber under controlled temperature and pressure and the exhaust of gases from the chamber under controlled pressure may be effected simultaneously so that controlled circulation of the gases through the material in the mixing chamber is effected. If desired the gases may be recirculated through the mixing chamber to secure most effective utilization of the gases employed.

In circulating or recirculating the gases through the mixing chamber the gases are introduced into the bite of the rotor adjacent one end of the mixing chamber and are removed from the "bite" at the opposite end of the mixing chamber to insure that all portions of the material being processed is being contacted by the treated gas. The gases introduced into the bite of the rotors are carried downwardly by the rotor action and fresh surfaces of plastic material are constantly being exposed to the incoming gas, so that all portions of the material are rapidly contacted.

In the apparatus illustrated by way of example in the drawings, the contacting gases are admitted to and discharged from the mixing chamber 1 by means of self-cleaning passageways extending down through the ram 7 and opening into the mixing chamber in the area of bite between the rotor. As shown in the drawings (see particularly Fig. 2) a passageway 15 opens into the mixing chamber adjacent the left-hand end of the chamber and a similar passageway 16 opens into the chamber adjacent the right-hand end thereof. The passageway 15 may be considered as being an inlet and the passage 16 an outlet, although it will be understood that the direction of flow may be reversed, or that both passageways may if desired be used as inlets or outlets. As the two passageways are of similar construction, the same reference numerals will be used to designate the corresponding parts of both.

In accordance with my invention, the fluid passageways 15 and 16 are self-clearing to prevent their being clogged by the plastic material being treated in the mixing chamber 1. Each of the passageways comprises a cylindrical tube 17, preferably formed of a non-corroding metal such as stainless steel. At the inner end of the tube 17, i. e., the mouth of the tube where it opens into the mixing chamber, there is provided an impeller element which is operable to prevent the plastic material in the mixing chamber from entering into and clogging the tube 17, while at the same time permitting the free passage of gases through the tube. In the embodiment illustrated in the drawings, the impeller is in the form of a helical screw 18 carried on the lower end of a rotatable shaft 19. The shaft 19 extends up through a bearing 20 at the top of tube 17 and is provided at its upper end with a worm gear 21 engaged by a worm 22 driven by a motor 23. The bearing 20, in conjunction with a flange 24, provided on the shaft 19, provides both a sleeve and a thrust bearing for the shaft, and also a fluid tight closure for the upper end of tube 17. The direction of rotation of the helical screw 18 by the motor 23 is such as to propel any plastic material entering tube 17 back into the mixing chamber, thereby keeping the passageways cleared. However, it will be understood that gases will be free to flow past the impeller by following the helical groove between the convolutions of the screw. The flow of gas through the tube 17 is not appreciably affected by the direction of rotation of the screw and hence the gases are free to flow past the screw in either direction.

Near its upper end the passageway 15 is connected with a supply pipe 25 controlled by a valve 26 for supplying selected gases through the passageway 15 to the mixing chamber at controlled temperatures and pressures. The valve 26 may if desired be automatically operated for pressure control. The passageway 16 is similarly connected near its upper end with an outlet pipe 27 controlled by a valve 28 which may likewise be an automatic pressure regulating valve. The passageways 15 and 16 are furthermore interconnected by a pipe 29 in which is provided a circulating fan or pump 31 and control valve 32. The pump 31 may be suitably driven either by a separate motor or by one of the motors 23. It will be understood that by suitable operation of the control valve and the circulating pump when required gases can be introduced into the mixing chamber through one or both of the passageways 15, 16, and can be exhausted through one or both of the passageways, or can be introduced into the chamber through one of the passageways and exhausted through the other. Alternatively, the same gas can be recirculated by means of the pump 31, make-up gas being supplied if desired through supply pipe 25.

The tube 17 extends through the ram 7 as shown and may be secured to the ram so as to be movable therewith when the ram is raised and lowered. In this event the driving mechanism for the impellers 18 would preferably be movable with the tube 17 and sliding or flexible connections would be provided with the supply and exhaust pipe 25, 27. However, in the embodiment shown in the drawings the tubes 17 are secured to the head-plate 9 and extend down through sleeves 33 provided in the ram 7, so that the tube 17 remains stationary rather than reciprocating with the ram.

Although the impellers 18 have been shown in the form of a helical screw it will be understood that other forms of impellers may be used for preventing the plastic material in the mixing chamber from entering and clogging the passageways while at the same time permitting flow of gases in either direction through the passageways. For example, the impeller may be in the form of an interrupted screw, or may be provided with the inclined surfaces or blades which will force the plastic material back into the mixing chamber while permitting passage of the gases.

Preferably the impellers 18 project slightly beyond the ends of the tubes 17 to insure that the ends of the tubes are not clogged by the plastic material. Moreover, the projecting end of the impeller has the advantageous effect that it agitates the plastic material adjacent the inner end of the passageways and thereby expedites the dispersion of gases into the material.

It will be seen that according to my process a predetermined amount of gas or vapor may be uniformly introduced into the mixing chamber of an internal mixer while the material is being processed at points which will insure more rapid contacting and most effective utilization of the gases. It will also be seen that a predetermined vapor pressure may be maintained in the mixing chamber and the plastic material may be worked in the presence of gases at suitable pressures. Moreover, gases may be continuously or intermittently drawn from the chamber during the mixing process. This is a great improvement over existing practice as it eliminates the hazard of blow-outs with the danger of injury to operating personnel when the ram is raised.

The controlled introduction of gases into the mixing chamber may also be used to advantage to control the temperature of the plastic being treated by circulating cooled or heated gases through the mass. This direct temperature control of the mass of plastic material being treated is superior to present practice of steam or water jacketing the walls of the chamber and the rotor. Moreover, in treating rubber or other materials with selected gases such as carbon dioxide the amount of treatment can be accurately controlled to secure the exact effect desired. My process is thus capable of speeding plasticization and imparting desirable characteristics to the material being treated. The cost of the process is reduced and the equipment needed to carry out my method in a standard internal mixer is simple and inexpensive.

What I claim and desire to secure by Letters Patent is:

1. In an internal mixer for plastic material, the combination with an essentially closed mixing chamber, of a fluid passageway leading to and opening into said mixing chamber, a rotatable helical screw at the mouth of said passageway, and means for rotating said screw to prevent clogging of said passageway by the plastic material while permitting flow of gas through said passageway in either direction.

2. In an internal mixer for plastic material, the combination with an essentially closed mixing chamber, parallel rotors in said chamber, and means for rotating said rotors in opposite directions, of a fluid passageway opening into said mixing chamber at the bite between said rotors, and an impeller at the mouth of said passageway, and means for rotating said impeller to return to said chamber any plastic material entering said passageway while permitting flow of gas through said passageway in either direction.

3. In an internal mixer for plastic material, the combination with a double cylindrical mixing chamber, parallel rotors in said chamber, and means for rotating said rotors in opposite directions, of fluid passageways opening into said mixing chamber at the bite between said rotors adjacent opposite ends of said chamber, a movable element at the mouth of each of said passageways to prevent said plastic material from entering and clogging said passageways while permitting the flow of fluid therethrough, means for supplying fluid to said chamber through one of the passageways and exhausting fluid through another.

4. In an internal mixer for plastic material, the combination with a mixing chamber, rotary means for mixing material in said chamber, an opening for feeding material into said chamber, and a movable closure for said opening, of a fluid passageway extending through said closure and opening at its inner end into said chamber, and a movable element at the inner end of said passageway for preventing said plastic material from entering and clogging said passageway while permitting flow of fluid therethrough.

5. In an internal mixer for plastic material, the combination with an essentially closed mixing chamber, and means for mixing material in said chamber, of spaced fluid passageways opening into said chamber, a movable element at the inner end of each of said passageways to prevent said plastic material from entering and clogging said passageways while permitting the flow of fluid therethrough, and means connecting said passageways externally of said chamber for recirculating fluid through said passageways and chamber.

6. In an internal mixer for plastic material, the combination with an essentially closed mixing chamber and means for mixing material in said chamber, of spaced fluid passageways opening into said chamber, a movable element at the inner end of each of said passageways to prevent plastic material from entering and clogging said passageways while permitting the flow of fluid therethrough, conduits connected with said passageway externally of said chamber, and control means for said conduits selectively operable to cause fluid to enter the mixing chamber under pressure to cause fluid to be exhausted from said chamber through one passageway while fluid is simultaneously supplied through another and to cause fluid to be exhausted from said chamber without simultaneously supplying fluid thereto.

7. In an internal mixer for plastic material, the combination with an essentially closed mixing chamber, of a fluid passageway opening into said chamber, a shaft of smaller diameter than said passageway extending therethrough, a helical screw in said shaft at the inner end of said passageway, and means for rotating said shaft and screw in a direction to impel any plastic material in said passageway back into said chamber and thereby prevent clogging of said passageway by said material.

8. In an internal mixer for plastic material, the combination with an essentially closed mixing chamber, and rotor means for mixing material in said chamber, of a passageway opening into said chamber, a helical screw at the inner end of said passageway, means for rotating said screw in a direction to prevent plastic material from said chamber entering and clogging said passageway, and means for supplying temperature controlled gases to said passageway, said gases being introduced into the mixing chamber through a helical groove of said screw and diffused through the mass by rotor action to control the temperature of the plastic material being treated.

9. In an internal mixer for plastic material, the combination with an essentially closed mixing chamber, and rotor means for mixing material in said chamber, of a passageway opening into said chamber, means connected with said passageway for forcing gas therethrough, a rotary impeller in said passageway and extending to the inner end thereof, and means for rotating said impeller to keep said passageway unobstructed by plastic to permit the passage of gas therethrough and to agitate the plastic material adjacent the inner end of said impeller.

10. In apparatus for treating plastic material, the combination with an essentially closed chamber for holding said material, of a passageway opening into said chamber, a rotary impeller at the inner end of said passageway having blade surfaces inclined to the axis of rotation of said impeller, means for rotating said impeller in a direction to prevent plastic material in said chamber from entering and obstructing said passageway, and means connected with said passageway for controlling the flow of gas through said passageway into or out of said chamber.

THOMAS ROBINSON.